US012387031B2

(12) United States Patent
Sethi (10) Patent No.: US 12,387,031 B2
(45) Date of Patent: Aug. 12, 2025

(54) REAL TIME STREAMABLE PAGE GENERATION FROM A DIGITAL DOCUMENT

(71) Applicant: Adobe Inc., San Jose, CA (US)

(72) Inventor: Jatin Sethi, New Delhi (IN)

(73) Assignee: Adobe Inc., San Jose, CA (US)

( * ) Notice: Subject to any disclaimer, the term of this patent is extended or adjusted under 35 U.S.C. 154(b) by 137 days.

(21) Appl. No.: 18/098,658

(22) Filed: Jan. 18, 2023

(65) Prior Publication Data

US 2024/0242017 A1 Jul. 18, 2024

(51) Int. Cl.
*G06F 40/149* (2020.01)
*H04N 1/32* (2006.01)

(52) U.S. Cl.
CPC ....... *G06F 40/149* (2020.01); *H04N 1/32128* (2013.01); *H04N 2201/3249* (2013.01)

(58) Field of Classification Search
CPC .................................................. G06F 40/149
See application file for complete search history.

(56) References Cited

U.S. PATENT DOCUMENTS

| 7,948,651 | B2 | 5/2011 | Truong et al. |
| 8,125,671 | B2 | 2/2012 | Seo |
| 9,396,174 | B1* | 7/2016 | Alves et al. ........ G06F 17/2247 |
| 11,474,767 | B1 | 10/2022 | Sait |
| 12,197,793 | B2 | 1/2025 | Jain et al. |
| 2003/0204731 | A1 | 10/2003 | Pochuev et al. |
| 2005/0111045 | A1 | 5/2005 | Imai |
| 2005/0203919 | A1* | 9/2005 | Deutsch et al. .......... G06F 7/00 |
| 2012/0265786 | A1* | 10/2012 | Arroute et al. ......... G06F 17/00 |
| 2013/0155457 | A1 | 6/2013 | Miura |
| 2015/0092237 | A1 | 4/2015 | Kanamoto |
| 2017/0206043 | A1 | 7/2017 | Boldt et al. |
| 2017/0329863 | A1 | 11/2017 | Metz et al. |
| 2020/0272871 | A1 | 8/2020 | Crampton et al. |
| 2020/0311982 | A1 | 10/2020 | Ogawa |
| 2021/0303944 | A1* | 9/2021 | Mostafa et al. ... G96K 15/1805 |
| 2023/0401218 | A1* | 12/2023 | Christner et al. ........................... G06F 16/24568 |
| 2024/0118842 | A1 | 4/2024 | Jain et al. |

OTHER PUBLICATIONS

U.S. Appl. No. 17/963,412, filed Dec. 7, 2023, "Non-Final Office Action", U.S. Appl. No. 17/963,412, filed Dec. 7, 2023, 13 pages.
Jain, Siddharth Kumar, et al., "US Application as Filed", U.S. Appl. No. 17/963,412, filed Oct. 11, 2022, 47 pages.

(Continued)

*Primary Examiner* — James J Debrow
(74) *Attorney, Agent, or Firm* — FIG. 1 Patents (57) ABSTRACT

Techniques and systems are described for real time streamable page generation from a digital document. A page generator module generates individually streamable pages from a digital document in which metadata is written at a beginning of the streamable pages that is usable to control rendering of the page. Therefore, upon receipt of the streamable page by a rendering engine of a receiver device (e.g., a printer), the metadata is usable to render the objects included in the streamable page as received. The streamable pages are renderable by a receiver device as individual pages and/or portions of the pages are received.

20 Claims, 8 Drawing Sheets

(56) References Cited

OTHER PUBLICATIONS

U.S. Appl. No. 17/963,412, filed May 30, 2024, "Non-Final Office Action", U.S. Appl. No. 17/963,412, filed May 30, 2024, 13 pages.
U.S. Appl. No. 17/963,412, filed Oct. 31, 2024, "Notice of Allowance", U.S. Appl. No. 17/963,412, filed Oct. 31, 2024, 8 pages.

* cited by examiner

```
1. void RealTimeStreamSaverRec::writeObjectsAndXref()
2. {
3. cosLin->PrepareSections(*this);
4.
5. //Write header
6. WriteHeader(dP, mSaveOutputStm, header);
7.
8.
9. //Keep whitespace for STREAM DICTIONARY
10. ASFilePos streamDictPos = ToASFilePos(mSaveOutputStm->tellg());
11. WriteWhitespace(mSaveOutputStm, 100);
12.
13. //Assign objnum to catalog
14. CosObj mCatalogObj = CosDocGetRoot(cosLin->mCosDoc);
15. InfoForObjInFile &catalogInfo = mSaveCtx->Save_GetInfoForObjInFile(mCatalogObj);
16.
17. //Assigns other Collection containing the pages object
18. markToWrite(cosLin->otherCollection, mSaveCtx->mSaver->mSaverState);
19. cosLin->otherCollection->MakeAndPopulateObjectStreams();
20. cosLin->otherCollection->AssignFileObjNumsForUncompressedObjects(*this, CosNewNull());
21. cosLin->otherCollection->AssignFileObjNumsForCompressedObjects(*this);
22. cosLin->otherCollection->FillObjectStreams(*this);
23.
24. //WRITE ALL THE INDIRECT OBJECTS SO IT BECOMES COMPLETE PAGE.
25. WriteOneIndirectObj(mSaveOutputStm, catalogInfo);
26.
27. // Store first page start position
28. ASFilePos firstPageStartPos = ToASFilePos(mSaveOutputStm->tellg());
29.
30. //Write Stream Dict
31. mSaveOutputStm->seekg(streamDictPos);
32. addStreamDict(*this, firstPageStartPos);
33.
34.
35.
36. //Return to the firstPageStart Position
37. mSaveOutputStm->seekg(firstPageStartPos)
```

Fig. 6A

```
42. ASUns32 numPages = cosLin->mNumPages;
43. for (ASUns32 pageNum = 0; pageNum < numPages; pageNum++)
44. {
45.   PLinCollection pageCollection = cosLin->pageCollections[pageNum];
46.   pageCollection->AssignFileObjNumsForUncompressedObjects(*this, CosNewNull());
47.   pageCollection->AssignFileObjNumsForCompressedObjects(*this);
48.   pageCollection->FillObjectStreams(*this);
49.
50.   //Write page to a temporary file
51.   TempPathName pagePath(ASGetRamFileSys());
52.   WriteAllUncompressedObjects(pagePath, this, cosLin, pageCollection);
53.
54.   //Write whitespace for hintobj
55.   ASFilePos hintObjPos = ToASFilePos(mSaveOutputStm->tellg());
56.   WriteWhitespace(mSaveOutputStm, 100);
57.
58.   //Obtain page Start Position
59.   ASFilePos pageStartPos = ToASFilePos(mSaveOutputStm->tellg());
60.
61.   //Write hintObj to file
62.   mSaveOutputStm->seekg(hintObjPos);
63.   //Generate hint dictinary containing page end offset and page object ID
64.   CosObj hint = generateHintDict(*this, pageStartPos, pageNum);
65.   InfoForObjInFile &hintInfo = mSaveCtx->Save_GetInfoForObjInFile(hint);
66.   mSaverState[hint] = toWrite;
67.   WriteOneIndirectObj(mSaveOutputStm, hintInfo);
68.
69.   //Write page to output file
70.   mSaveOutputStm->seekg(pageStartPos);
71.   CopyPathToStm(pagePath, mSaveOutputStm);
72.
73.   //update offset in xref table
74.   OffsetFilePositionsInContext(mSaveCtx, pageCollection,
75.     pageStartPos,
76.     true);
77.
78.
79. }
80. //Write Xref
81. XrefSection xref;
82. xref = new XrefStream(cosLin->mCosDoc);
83. ((XrefTable*)xref)->FullSave_WriteMainXrefTable();
84.
85. //Write Trailer
86. WriteTrailerAndInstallXref(xref, IncludeIDAndInfo, NotForLinearized);
87.
88. //Write StartXref and EOF
89. WriteStartxrefAndEOF();
90.
91. }
```

REAL TIME STREAMABLE PAGE GENERATION FROM A DIGITAL DOCUMENT

CROSS REFERENCE TO RELATED APPLICATIONS

This Application incorporates by reference an entirety of U.S. application Ser. No. 17/963,412, filed Oct. 11, 2022, and titled "Self-Consumable Portion Generation from a Digital Document."

BACKGROUND

Digital documents are consumable in a variety of different usage scenarios that include use of different device types, different types of operating systems that are executable by those devices, different types of applications that are executable via those operating systems, and so on. To address this, a portable document format was developed as a file format to present digital documents in a manner that is independent of these different usage scenarios. This functions to increase interoperability of digital documents that employ this format.

However, in real-world scenarios the amount of data included as part of the digital document continues to increase. This increase presents challenges in conventional usage scenarios which limit an ability to consume this document by devices and associated functionality that has not expanded to address this increase. Conventional techniques that are developed to address these challenges reduce visual quality and accuracy of the digital documents when rendered.

SUMMARY

Techniques and systems are described for streamable page generation from a digital document. A page generator module generates individually streamable pages from a digital document in which metadata is written at a beginning of the streamable pages that is usable to control rendering of the page. Therefore, upon receipt of the streamable page by a rendering engine of a receiver device (e.g., a printer), the metadata is usable to render the objects included in the streamable page as received. The streamable pages are renderable by a receiver device as individual pages and/or portions of the pages are received.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures Entities represented in the figures are indicative of one or more entities and thus reference is made interchangeably to single or plural forms of the entities in the discussion.

FIGS. 6A and 6B depict an example of code as employed to implement functionality of the page generator module of FIG. 2.

DETAILED DESCRIPTION

Overview

File formats have been developed to present digital documents in a manner that is independent of different usage scenarios. An example of this includes a portable document format that functions to increase digital document interoperability. A portable digital document format specifies a header, a plurality of objects, and a cross-reference table that specifies an offset (e.g., a byte offset) that is used to locate individual objects from the plurality of objects within the digital document.

In practice, however, the cross-reference table resides at the end of the digital document. Because of this, an entirety of the digital document is first obtained (e.g., stored to local memory), at which point the digital document is capable of being rendered. Consequently, usage scenarios having limited resources are incapable of processing digital documents that follow this format that do not have sufficient resources to store an entirety of the digital document together.

In one such example, a legacy printer having a limited amount of memory resources available to maintain a print queue is incapable of rendering digital documents "as is" that consume an amount of memory greater than that which is available in the print queue. Conventional techniques used to overcome these challenges are forced to forgo the advantages provided by this format, reduce visual quality and accuracy of the digital documents when rendered, and hinder device operation, e.g., due to resources consumed to reformat the digital document into a raster-based format.

Accordingly, techniques and systems are described for streamable page generation from a digital document. The streamable pages are renderable by a receiver device as the pages are received. As such, these techniques overcome challenges of conventional techniques and expand functionality to receiver devices that otherwise are incapable of rendering the digital document.

In one example, a digital document is received by a page generator module of a digital document system at a sender device. The digital document is formatted to include a header, a plurality of objects, and a cross-reference table that specifies an offset (e.g., a byte offset) that is used to locate individual objects from the plurality of objects. An example of this format is a portable document format as previously described.

The page generator module then generates individually streamable pages from the digital document. To do so, the page generator module builds data structures that define which objects are included in which pages. The page generator module also determines an order of importance of the objects within the pages (e.g., a priority in which the objects are to be rendered as part of the page) and marks the objects within a respective page based on this priority. An example of such a priority is to mark information for indirect objects versus direct objects and compressed objects.

The page generator module then generates the streamable pages based on these data structures. As part of this, the page generator modules starts by writing the objects and other content of the digital document page wise, e.g., to write indirect objects and compressed objects. A header and/or trailer is also written, e.g., to indicate a file type that uniquely identifies the file format, an indication of a format version, and so on.

After writing the content of the page (i.e., the objects and header), the page generator module writes metadata that is usable, during rendering, to render the objects as received. The page generator module, for instance, determines a byte length and identifiers of "where" objects are located in the streamable page, object types, and so forth from the written objects, header, trailer, and so on. The page generator module then writes metadata at a beginning of the streamable page as a streaming dictionary that identifies these objects.

Therefore, upon receipt of the streamable page by a rendering engine, the metadata is usable to render the objects included in the streamable page as received without waiting for an entirety of the digital document to be received or even an entirety of the streamable page. The metadata, for instance, is used by a rendering engine of a receiver device (e.g., a printer) to determine how many bytes are to be read for each page, objects to be written, and so forth as part of a streaming dictionary included in the metadata. The rendering engine then renders the objects (i.e., rasterizes as part of a bitmap) as the objects are received, which is not possible in conventional techniques. In this way, operational efficiency is improved while supporting legacy formats for use with legacy devices which is not possible in conventional techniques. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Digital Document Environment

Figure 1:
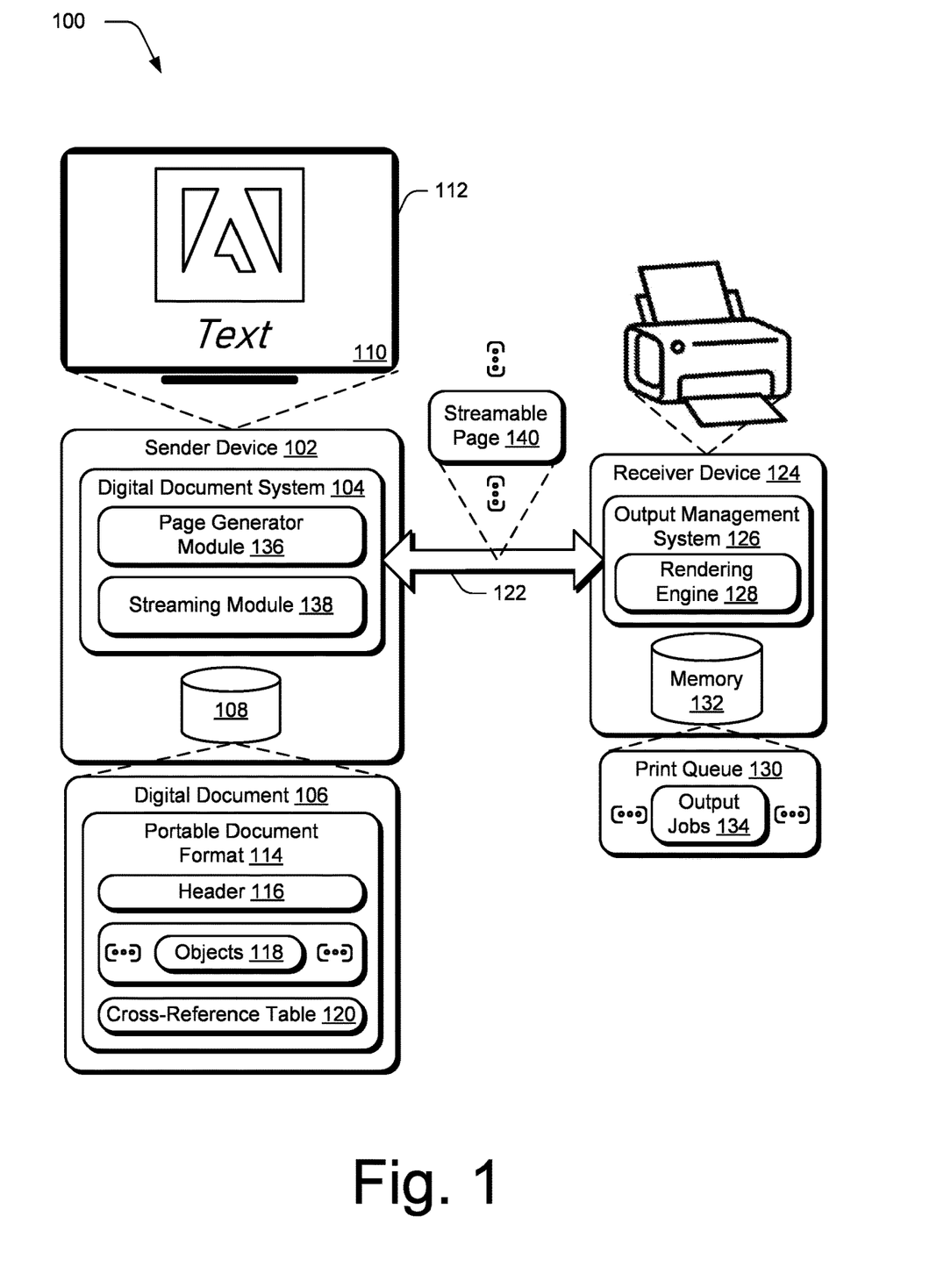
FIG. 1 is an illustration of a digital medium environment in an example implementation that is operable to employ streamable page generation techniques from a digital document as described herein.

FIG. 1 is an illustration of a digital medium environment 100 in an example implementation that is operable to employ streamable page generation techniques from a digital document as described herein. The illustrated environment 100 includes a sender device 102, which is configurable in a variety of ways.

The sender device 102, for instance, is configurable as computing device, examples of which include a desktop computer, a laptop computer, a mobile device (e.g., assuming a handheld configuration such as a tablet or mobile phone), and so forth. Thus, the sender device 102 ranges from full resource devices with substantial memory and processor resources (e.g., personal computers, game consoles) to a low-resource device with limited memory and/or processing resources (e.g., mobile devices). Additionally, although a single sender device 102 is shown, the sender device 102 is also representative of a plurality of different devices, such as multiple servers utilized by a business to perform operations "over the cloud" as described in FIG. 7.

The sender device 102 is illustrated as including a digital document system 104. The digital document system 104 is implemented at least partially in hardware of the sender device 102 to process and transform a digital document 106, which is illustrated as maintained in a storage device 108 of the sender device 102. Such processing includes creation of the digital document 106, modification of the digital document 106, and rendering of the digital document 106 in a user interface 110 for output, e.g., by a display device 112. Although illustrated as implemented locally at the sender device 102, functionality of the digital document system 104 is also configurable as whole or part via functionality available via a network, such as part of a web service or "in the cloud."

The digital document 106 in this example is configured according to a portable document format 114 that specifies an arrangement of parts of the document within a file. In the illustrated example, the portable document format 114 includes a header 116, a plurality of objects 118 and a cross-reference table 120. The header 116, for instance, includes a "magic number" (e.g., incorporating file type metadata that uniquely identifies the file format) and an indication of a format version. In one example, the plurality of objects 118 are arranged according to a carousel object structure (COS) specifying a file tree. The objects 118 are configurable as Boolean values, real numbers, integers, strings, names, arrays, dictionaries, streams, null objects, and so forth. Object types include direct objects that are embedded in another object and indirect objects that are numbered with an object number and a generation number. Indirect objects are implemented in one example as object streams.

The cross-reference table 120 is located near the end of the file and specifies an offset of the objects 118 within the digital document 106. The cross-reference table 120, for instance, specifies a byte offset of each indirect object starting at a beginning of the digital document 106. This configuration supports efficient random access to the plurality of objects 118 within a file of the digital document 106. However, as previously described this format involves download of an entirety of the digital document 106 in order to obtain the cross-reference table 120 to then locate and render the objects 118.

The sender device 102, for instance, is communicatively coupled (e.g., via a communication channel 122 such as a network connection or local connection) with a receiver device 124 that is configured to process the digital document 106. In the illustrated example, the receiver device 124 is configured as a printer operable to print the digital document 106 onto a substrate, e.g., ink to paper. Other receiver device 124 configurations are also contemplated.

The receiver device 124 includes an output management system 126 having a rendering engine 128 that is configured to render the digital document 106 into an output buffer as a raster object (e.g., bitmap) that is then printed by a printing mechanism. As part of print management, a print queue 130 is maintained in memory 132 (e.g., physical memory) having output jobs 134 to be rendered.

As previously described, advances in technology and functionality of some types of receiver devices have not kept up with digital document advancements. This is often due to hardware costs, legacy designs, and so forth. In a printer scenario, for instance, a print queue included as part of a low-cost printer may not have a sufficient amount of space to store an entirety of a digital document in memory, sufficient amount of processing resources to render the digital document, and so forth.

Conventional techniques used to address this, while reducing a failure rate, involve increased amounts of data flow, reduction in visual quality, and defeat an underlying purpose of the portable document format 114 to provide rich content in an independent format. These challenges are compounded as an amount of functionality included in digital documents continues to expand.

Accordingly, a page generator module 136 and streaming module 138 is employed by the digital document system 104 to generate one or more streamable pages (illustrated as streamable page 140) from the digital document 106 that overcome these challenges. The streamable page 140, for instance, is one of a plurality of streamable pages arranged in a printing order in which each description is taken from a respective page of the digital document 106 and is self-contained. Further, the streamable page 140 is configured to include metadata at a beginning of the page such that objects included in the page are renderable as received. As a result, the receiver device 124 is able to begin rendering of the streamable pages 140 (and portions within the pages) as received and delete those portions and pages from memory 132 after rendering, thereby improving operation of the receiver device 124.

This supports rendering by a legacy rendering engine 128 without change, and thus expands this functionality to a wide range of receiver device 124 types without modification of those devices. In this way, the streamable pages 140 support increased rendering efficiency in that the portions within the streamable pages 140 are rendered as received and make printing of the digital document 106 possible in low-resource scenarios that otherwise would not be possible, e.g., without a hard disk by the receiver device 124. Further discussion of these and other examples is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Streamable Page Generation and Rendering

The following discussion describes streamable page generation and rendering techniques that are implementable utilizing the previously described systems and devices. Aspects of each of the procedures are implemented in hardware, firmware, software, or a combination thereof. Procedures are shown as a set of blocks that specify operations performed by one or more devices and are not necessarily limited to the orders shown for performing the operations by the respective blocks. In portions of the following discussion, reference will be made to FIGS. 1-6B.

Figure 2:
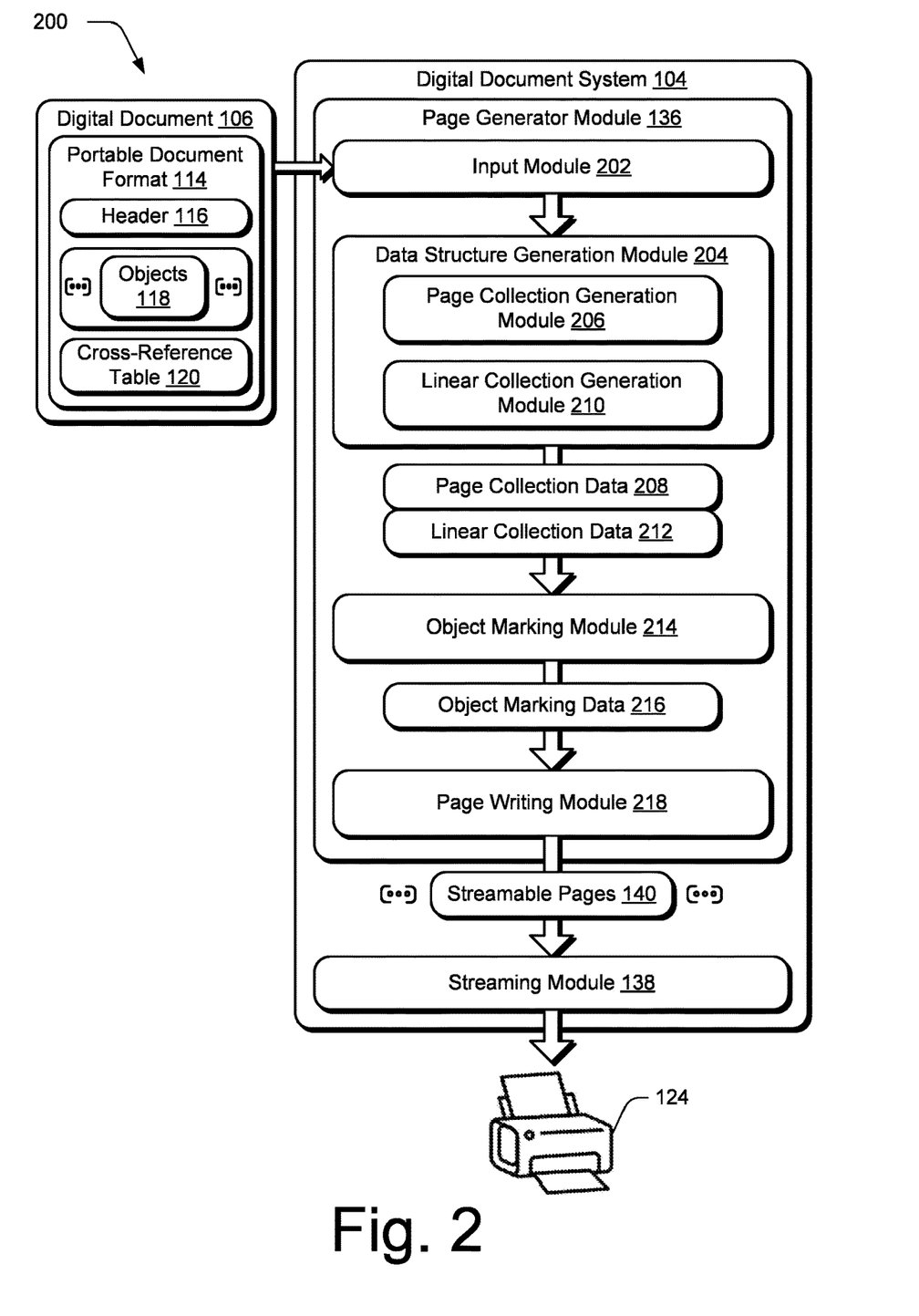
FIG. 2 depicts a system in an example implementation showing operation of a page generator module of FIG. 1 in greater detail.

FIG. 2 depicts a system 200 in an example implementation showing operation of a page generator module 136 of FIG. 1 in greater detail. To begin, an input module 202 receives a digital document 106 including a header 116, a plurality of objects 118, and a cross-reference table 120 indicating an offset of the plurality of objects, respectively, within the digital document 106 (block 402). The digital document 106, for instance, is configured according to a portable document format 114 that specifies an arrangement of parts of the document within a file. A portable document format 114 includes a header 116, a plurality of objects 118 and a cross-reference table 120. The header 116 is configurable to uniquely identify a file format and an indication of a format version. The plurality of objects 118 in this example are arranged according to a carousel object structure (COS) specifying a file tree. The objects 118 are configurable as Boolean values, real numbers, integers, strings, names, arrays, dictionaries, streams, null objects, and so forth. Object types include direct objects that are embedded in another object and indirect objects that are numbered with an object number and a generation number. Indirect objects are implemented in one example as object streams.

The cross-reference table 120, in a conventional portable document format 114, is located near the end of the file and specifies an offset of the objects 118 within the digital document 106, e.g., as a byte offset of each indirect object starting at a beginning of the digital document 106. This configuration supports efficient random access to the plurality of objects 118 within a file of the digital document 106. However, as previously described this format involves download of an entirety of the digital document 106 in order to obtain the cross-reference table 120 to then locate and render the objects 118.

Accordingly, the page generator module 136 is configured to generate streamable pages 140 from the digital document 106 that overcomes these technical challenges. To do so, the page generator module 136 "breaks apart" the digital document 106 in real time as the digital document 106 is received, e.g., for printing by the receiver device 124.

As part of this, the page generator module 136 copies specific page content (e.g., objects and headers) from the digital document 106 to form individual streamable pages, e.g., starting with a first page of the digital document 106. The page generator module 136, based on the content included in the respective streamable pages, then forms metadata (e.g., in object form) that is saved at a beginning of the streamable page. The metadata functions similar to a cross-reference table by supporting functionality usable to indicate characteristics of the streamable page that are relevant to rendering by a rendering engine 128, e.g., page length, offset for "where" to locate individual objects, and so forth. As a result, each streamable page 140 is self-sufficient.

The page generator module 136 then generates a first page output (e.g., that follows a page ordering of the digital document 106) as a vectorized output and thus overcomes limitations of conventional raster-based approaches and preserves visual accuracy. In an implementation, the page generator module 136 also generates metadata that is included at a beginning of the digital document 106 as a whole, e.g., to locate individual pages for rendering. Further, this is performable without a user or even the receiver device 124 being made aware of how this functionality is achieved, thereby supporting operation using legacy systems and receiver devices.

To generate a plurality of streamable pages 140, respectively, from a plurality of pages of the digital document 106 (block 404), the page generator module 136 employs a data structure generation module 204 to generate data structures that serve as a basis to generate the individual streaming pages 140. An example of this is a page collection generation module 206 that generates page collection data 208 describing content (e.g., objects) included in respective pages in the digital document 106. A linear collection generation module 210 is also employed to generate linear collection data 212 that describes objects to be included as a collection in a linearized file, e.g., according to an order of importance as further described below.

The page collection data 208 and the linear collection data 212 are then received as an input by an object marking module 214. The object marking module 214 is configured to generate object marking data 216 that is used to mark objects within a respective page in an order of priority (i.e., importance) with respect to rendering of the page. The object marking data 216, for instance, describes an order in which objects are to be included within a respective page in order to support rendering. This is usable to specify an ordering based on type of object, e.g., indirect objects versus direct objects versus compressed objects and so forth. This ordering is then used as part of writing streamable pages by a page writing module 218 as further described below.

Figure 3:
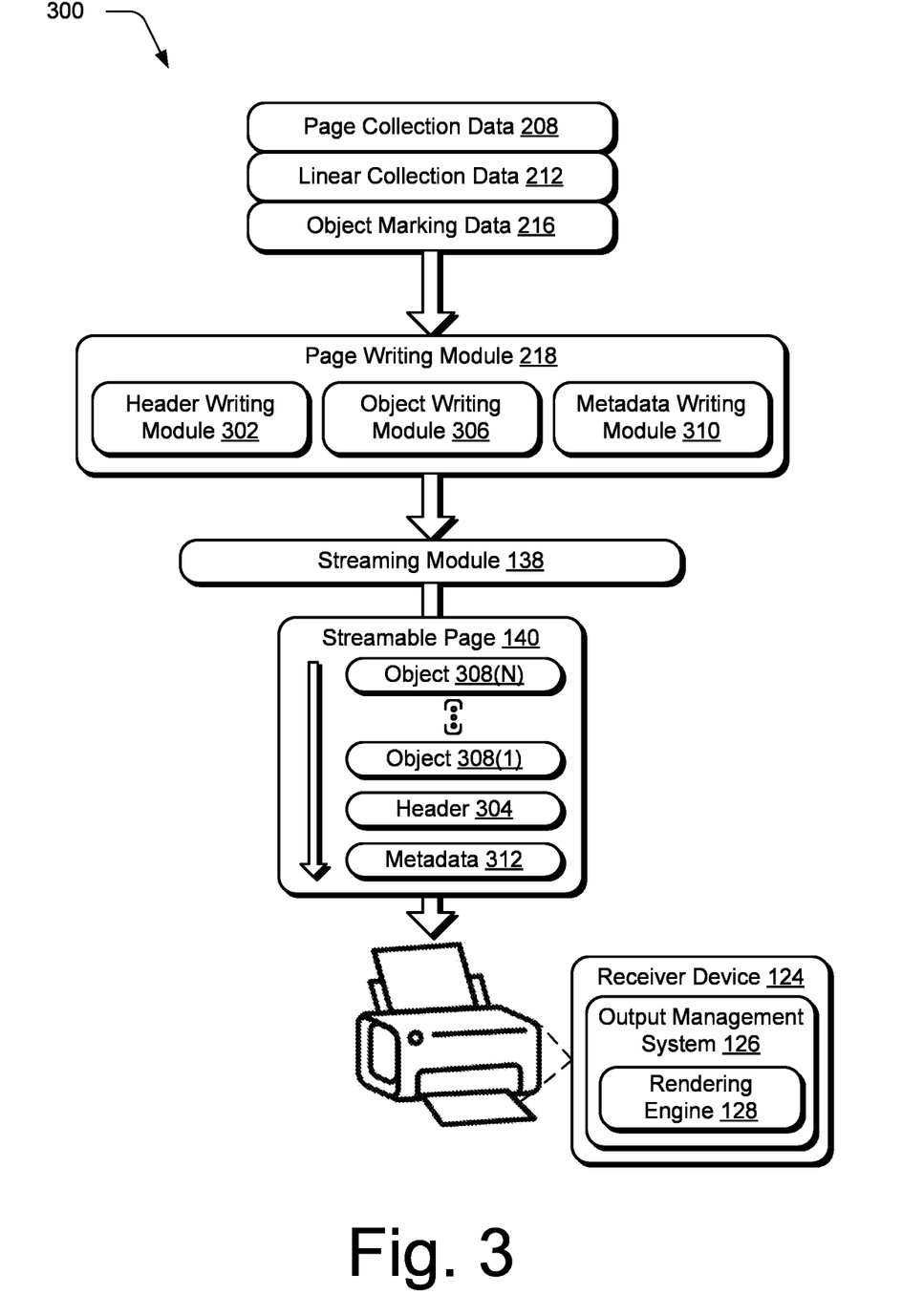
FIG. 3 depicts a system in an example implementation showing operation of a page writing module of FIG. 2 in greater detail.

FIG. 3 depicts a system 300 in an example implementation showing operation of a page writing module of FIG. 2 in greater detail. The object marking data 216 along with the page collection data 208 and the linear collection data 212 are received as an input to a page writing module 218 to generate the streamable pages 140. Examples of functionality to do so includes a header writing module 302 that is configured to write a header 304 of the streamable page 140. As previously described, a header 304 is configurable to include "magic number" (e.g., incorporating file type metadata that uniquely identifies the file format) and an indication of a format version that is usable by the rendering engine 128 to determine what file format is to be rendered as employed by the streamable page 140.

An object writing module 306 is configured to write at least one object included in a respective page of the digital document 106 to a respective streamable page 140 (block 406). Examples of objects are illustrated as object 308(1), . . . , object 308(N). The objects 308(1)-308(N) are ordered according to the object marking data to support rendering as the objects are received based on object types. In one example, the plurality of objects 118 are arranged and stored in the streamable page 140 according to a carousel object structure (COS) specifying a file tree. The objects 308(1)-308(N) are configurable as Boolean values, real numbers, integers, strings, names, arrays, dictionaries, streams, null objects, and so forth. Object types include direct objects that are embedded in another object and indirect objects that are numbered with an object number and a generation number. Indirect objects are implemented in one example as object streams.

A metadata writing module 310 is then employed to write metadata 312 in the streamable page 140 (block 408). The metadata 312 is disposed before the objects 308(1)-308(N) in a file of the streamable page 140, e.g., at a beginning of the file (block 410). The metadata 312 describes location of objects 308(1)-308(N) within the file and other information usable by a rendering engine 128 to render the streamable page 140 as a standalone file. The metadata 312, for instance, indicates an overall page length, identifies a number of objects included in the file, a byte offset of the objects, and so forth. In this way, the metadata 312 is configurable to function similar to a cross-reference table 120 but is usable to render the objects 308(1)-308(N) as received by the receiver device from a streaming module 138 in a stream of data.

The plurality of streamable pages are streamed to a receiver device (block 412), e.g., as written in real time. For each streamable page, the metadata is streamed and then at least one object from the streamable page 140 is streamed (block 414). In the illustrated example, the metadata 312 of the streamable page 140 is first streamed by the streaming module 138, which is then followed in the data stream by a header 304 and then objects 308(1)-308(N) to be rendered. As a result, the metadata 312 and header 304 indicate "how" the objects 308(1)-308(N) are renderable by the rendering engine 128 and are received first in this example. This is performable without waiting for those objects to be received and then waiting for a cross reference table as involved in conventional techniques.

Figure 4:
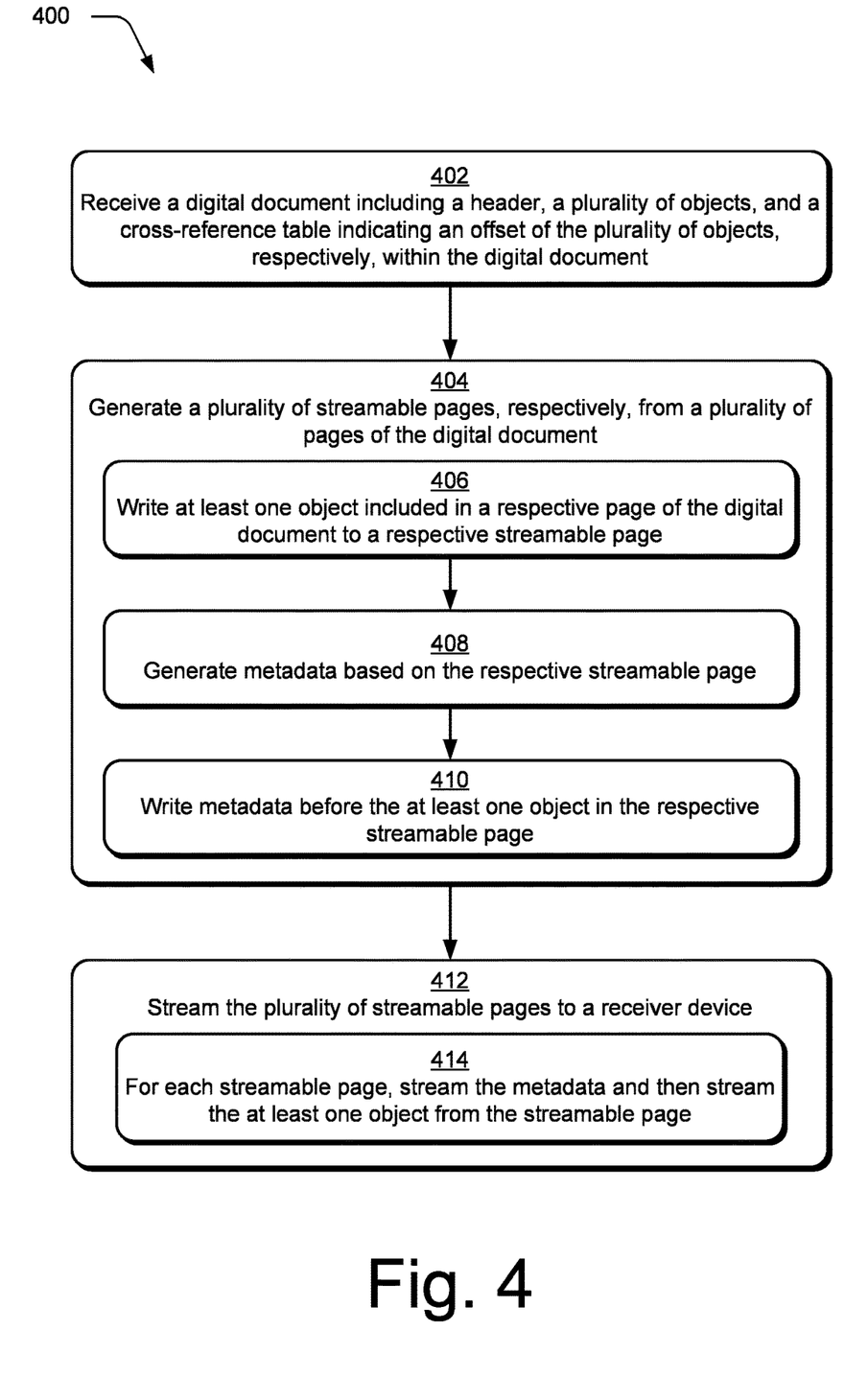
Figure 5:
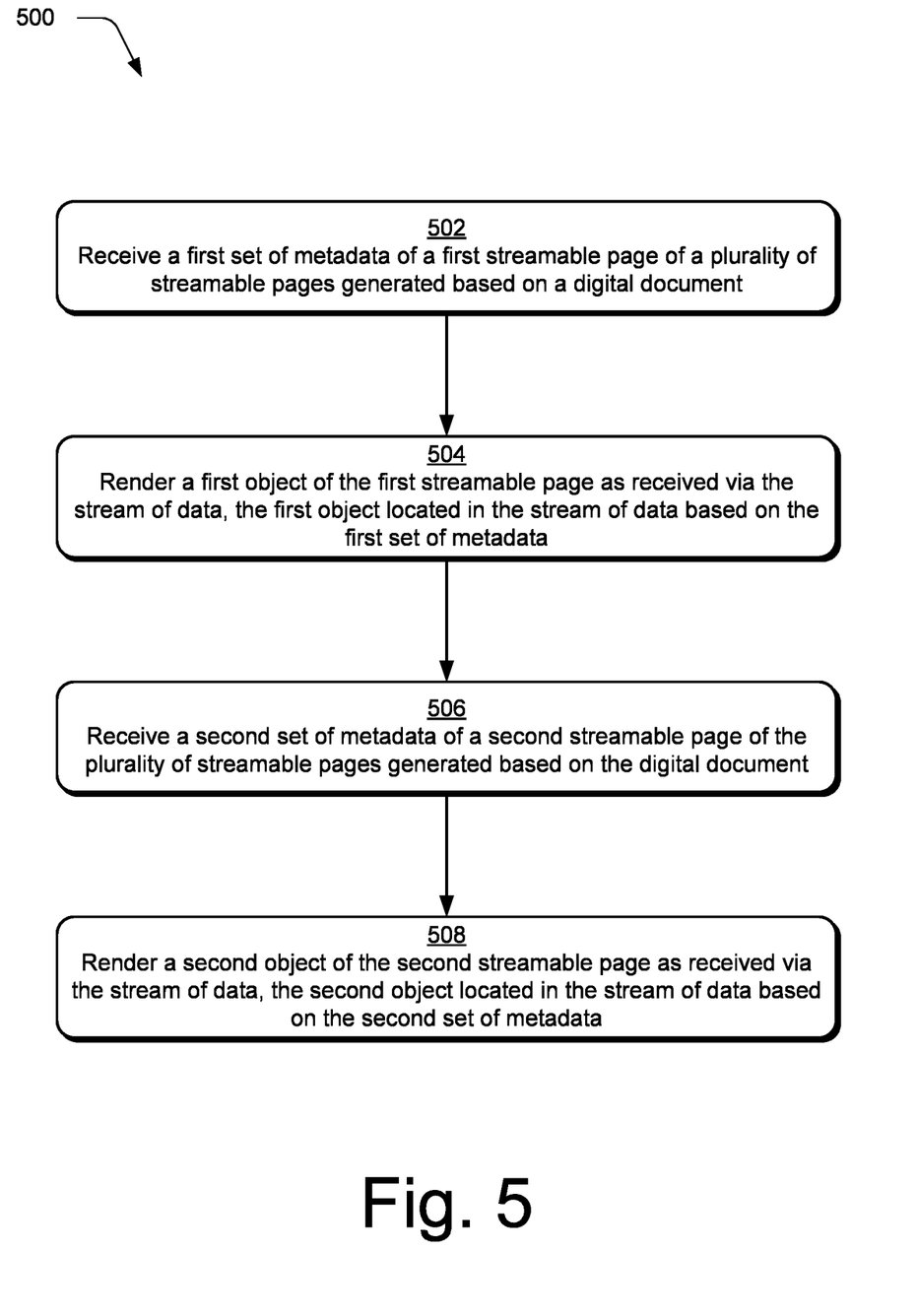
FIG. 5 depicts a procedure in an example implementation of rendering of a streamable page as streamed according to a procedure of FIG. 4.

FIG. 5 depicts a procedure 500 in an example implementation of rendering of a streamable page as streamed according to a procedure 400 of FIG. 4. Continuing with the example of FIG. 4, a receiver device 124 receives, via data streamed to the receiver device, a first set of metadata of a first streamable page of a plurality of streamable pages generated based on a digital document (block 502). The receiver device 124, for instance, receives the metadata 312 from a streaming module 138 from a sender device 102 via a communication channel 122.

A rendering engine 128 of the receiver device 124 then renders a first object (e.g., object 308(1)) of the first streamable page as received via the stream of data. The first object is located in the stream of data based on the first set of metadata (block 504), e.g., via a byte offset. Object 308(1), for instance, is rasterized as a bitmap to a frame buffer. This process continues for subsequent objects included in the streamable page 140 and as such the streamable page 140 is separately renderable from other streamable pages formed from the digital document 106.

Continuing on, the receiver device 124 then receives a second set of metadata of a second streamable page of the plurality of streamable pages (block 506). The second streamable page, for instance, follows the first streamable page in a page ordering of the digital document 106. The rendering engine 128 of the receiver device then renders a second object of the second streamable page as received via the stream of data. The second object is also located in the stream of data, but in this instance is based on the second set of metadata (block 508). Thus, the streamable pages are streamed and rendered in order as standalone files that follow a page order of the digital document 106. In this way, the plurality of streamable pages 140 is configurable to support legacy devices and yet maintain compliance with an original format of the digital document, e.g., in accordance with a portable document format. This functionality acts to preserve visual quality and device operation.

Figure 6A:
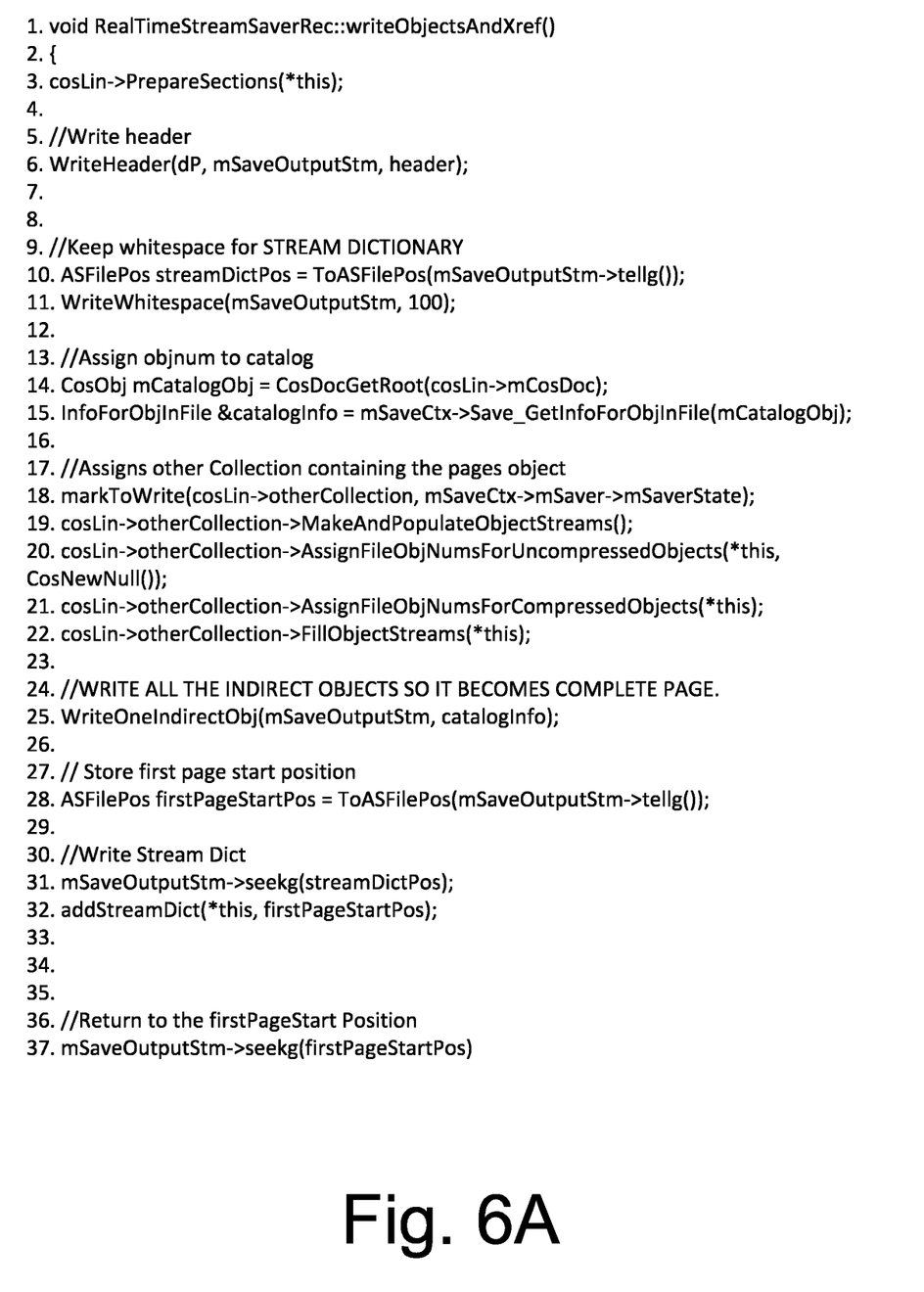

FIGS. 6A and 6B depict an example of code as employed to implement functionality of the page generator module 136. As illustrated, the code begins by writing a header and preserves "whitespace" for the metadata at a beginning of an overall file formed by a plurality of streamable pages 140. The metadata is implemented as a stream dictionary. Objects are written to form the page collection data 208 and linear collection data 212, followed by writing the stream dictionary as the metadata in the preserved whitespace. This process continues for each of the pages of the digital document 106. Individual streamable pages 140 are then formed, and the metadata 312 for individual pages is represented as a "hintObj." A variety of other examples are also contemplated.

Example System and Device

Figure 7:
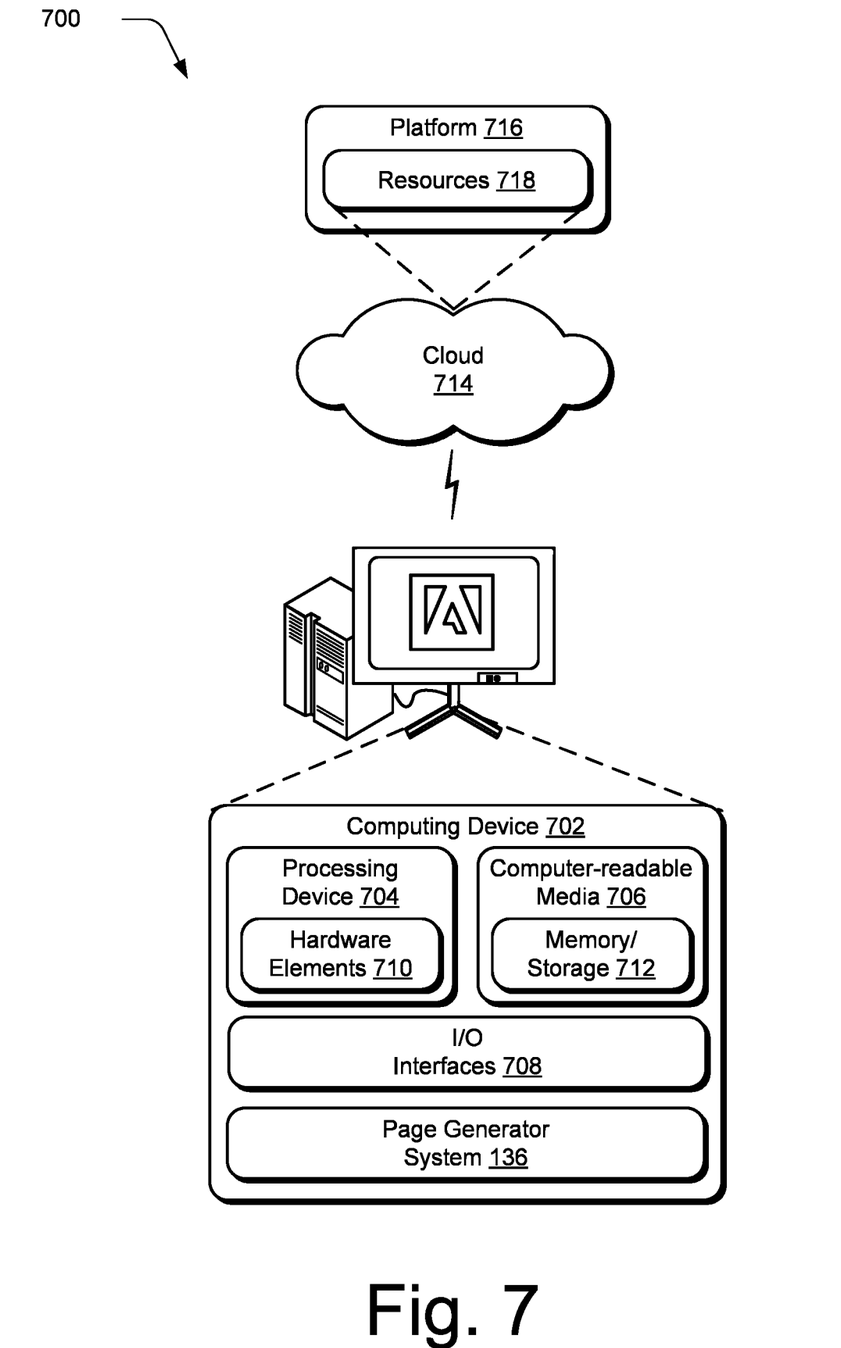
FIG. 7 illustrates an example system including various components of an example device that can be implemented as any type of computing device as described and/or utilize with reference to FIGS. 1-6B to implement embodiments of the techniques described herein.

FIG. 7 illustrates an example system generally at 700 that includes an example computing device 702 that is representative of one or more computing systems and/or devices that implement the various techniques described herein. This is illustrated through inclusion of the page generator module 136. The computing device 702 is configurable, for example, as a server of a service provider, a device associated with a client (e.g., a client device), an on-chip system, and/or any other suitable computing device or computing system.

The example computing device 702 as illustrated includes a processing device 704, one or more computer-readable media 706, and one or more I/O interface 708 that are communicatively coupled, one to another. Although not shown, the computing device 702 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 704 is representative of functionality to perform one or more operations using hardware. Accordingly, the processing device 704 is illustrated as including hardware element 710 that is configurable as processors, functional blocks, and so forth. This includes implementation in hardware as an application specific integrated circuit or other logic device formed using one or more semiconductors. The hardware elements 710 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 706 is illustrated as including memory/storage 712 that stores instructions that are executable to cause the processing device 704 to perform operations. The memory/storage 712 represents memory/storage capacity associated with one or more computer-readable media. The memory/storage 712 includes volatile media (such as random access memory (RAM)) and/or nonvolatile media (such as read only memory (ROM), Flash memory, optical disks, magnetic disks, and so forth). The memory/storage 712 includes fixed media (e.g., RAM, ROM, a fixed hard drive, and so on) as well as removable media (e.g., Flash memory, a removable hard drive, an optical disc, and so forth). The computer-readable media 706 is configurable in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 702. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 710. The computing device 702 is configured to implement particular instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing device 704. The instructions and/or functions are executable/operable by one or more articles of manufacture (for example, one or more computing devices 702 and/or processing devices 704) to implement techniques, modules, and examples described herein.

The techniques described herein are supported by various configurations of the computing device 702 and are not limited to the specific examples of the techniques described herein. This functionality is also implementable all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 include applications and/or data that can be utilized while computer processing is executed on servers that are remote from the computing device 702. Resources 718 can also include services provided over the Internet and/or through a subscriber network, such as a cellular or Wi-Fi network.

The platform 716 abstracts resources and functions to connect the computing device 702 with other computing devices. The platform 716 also serves to abstract scaling of resources to provide a corresponding level of scale to encountered demand for the resources 718 that are implemented via the platform 716. Accordingly, in an interconnected device embodiment, implementation of functionality described herein is distributable throughout the system 700. For example, the functionality is implementable in part on the computing device 702 as well as via the platform 716 that abstracts the functionality of the cloud 714.

In implementations, the platform 716 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a processing device, the method comprising:
   receiving, by the processing device, a digital document including a header, a plurality of objects, and a cross-reference table indicating an offset of the plurality of objects, respectively, within the digital document;
   generating, by the processing device, a plurality of streamable pages, respectively, from a plurality of pages the digital document, the generating including for a respective said streamable page:
      writing a streamable-page header and at least one object included in a respective said page of the digital document from the plurality of objects to the respective said streamable page; and
      writing metadata before the at least one object in the respective said streamable page, the metadata including data usable to locate the at least one object within the streamable page; and
   streaming, by the processing device, the plurality of streamable pages to a receiver device.

2. The method as described in claim 1, wherein the generating includes identifying the at least one object included in the respective said page based on a byte offset defined by the cross-reference table of the digital document.

3. The method as described in claim 1, wherein the metadata usable to locate the at least one object is configured as a streaming dictionary.

4. The method as described in claim 1, wherein the streaming includes streaming the metadata for the respective said streamable page and then streaming the at least one object for the respective said streamable page.

5. The method as described in claim 4, wherein the metadata configures the respective said streamable page for rendering by a rendering engine of a receiver device as the at least one object is received by the rendering engine as a result of the streaming.

6. The method as described in claim 1, wherein each of the plurality of streamable pages is configured, respectively, in accordance with a portable document format.

7. The method as described in claim 1, wherein the respective said streamable page includes a header disposed before the at least one object that identifies a file format.

8. The method as described in claim 7, wherein the header is disposed after the metadata in the respective said streamable page.

9. The method as described in claim 1, wherein:
   the digital document is incapable of being rendered until receipt of the cross-reference table; and
   the at least one object is a vector object obtained from the digital document.

10. The method as described in claim 1, wherein the receiver device is configured to rasterize the plurality of streamable pages.

11. A method implemented by a receiver device, the method comprising:
   receiving, via data streamed to the receiver device, a first set of metadata of a first streamable page of a plurality of streamable pages generated based on a digital document, the first set of metadata configured as a first streamable dictionary indicating how may bytes are to be read for the first streamable page;

rendering, by a rendering engine of the receiver device, a first object of the first streamable page as received via the stream of data, the first object located in the stream of data based on the first streamable dictionary included in the first set of metadata;

receiving, via the data streamed to the receiver device, a second set of metadata of a second streamable page of the plurality of streamable pages, the second set of metadata configured as a second streamable dictionary indicating how may bytes are to be read for the second streamable page; and rendering, by a rendering engine of the receiver device, a second object of the second streamable page as received via the stream of data, the second object located in the stream of data based on the second streamable dictionary included in the second set of metadata.

12. The method as described in claim 11, wherein the first streamable dictionary is disposed after a first streamable page header and before the first object in the stream of data of the first streamable page and the second streamable dictionary is disposed after a second streamable page header and before the second object in the stream of data of the second streamable page.

13. The method as described in claim 11, wherein the first streamable page and the second streamable page are received from a sender device that maintains the digital document as a single portable document format file.

14. The method as described in claim 11, wherein the first streamable page includes a first header that uniquely identifier a respective file format and the second streamable page includes a second header that uniquely identifier a respective file format included in the data streamed to the receiver device.

15. The method as described in claim 11, wherein the receiver device is a printer configured to rasterize the first and second streamable pages.

16. A system comprising:
an input module implemented by a processing device to receive a digital document including a header, a plurality of objects, and a cross-reference table indicating an offset of the plurality of objects, respectively, within the digital document;

a page writing module implemented by the processing device to generate a plurality of streamable pages, respectively, from a plurality of pages the digital document, the generating including:
an object writing module configured to write, for a respective said streamable page, at least one object included in a respective said page of the digital document from the plurality of objects; and
a metadata writing module configured to write metadata before the at least one object in the respective said streamable page, the metadata including data usable to locate the at least one object included within the streamable page; and a streaming module configured to stream the plurality of streamable pages to a receiver device.

17. The system as described in claim 16, wherein the object writing module is configured to identify the at least one object included in the respective said page based on a byte offset defined by the cross-reference table of the digital document.

18. The system as described in claim 16, wherein the metadata usable to locate the at least one object is configured as a streaming dictionary.

19. The system as described in claim 16, wherein the streaming module is configured to stream the metadata for the respective said streamable page before streaming the at least one object for the respective said streamable page.

20. The system as described in claim 19, wherein the metadata configures the respective said streamable page for rendering by a rendering engine of a receiver device as the at least one object is received by the rendering engine as a result of the streaming.

* * * * *